United States Patent [19]

Crist

[11] Patent Number: 4,875,269
[45] Date of Patent: Oct. 24, 1989

[54] UNDERLIFT ATTACHMENT FOR TOW TRUCKS

[76] Inventor: Larry L. Crist, West Highway 33, Crete, Nebr. 68333

[21] Appl. No.: 192,153

[22] Filed: May 10, 1988

[51] Int. Cl.⁴ ................................................. B60P 3/12
[52] U.S. Cl. ..................................... 29/401.1; 29/428; 414/563; 414/786; 280/402
[58] Field of Search ................ 414/563, 786; 280/402; 29/401.1, 428

[56] References Cited

U.S. PATENT DOCUMENTS

| | | | |
|---|---|---|---|
| 3,924,763 | 12/1975 | Pigeon | 414/563 |
| 4,384,817 | 5/1983 | Peterson | 414/563 |
| 4,451,193 | 5/1984 | Cannon, Jr. et al. | |
| 4,473,334 | 9/1984 | Brown | |
| 4,534,579 | 8/1985 | Shackelford, Sr. | |
| 4,557,496 | 12/1985 | Sill | |
| 4,573,857 | 3/1986 | Porter, Sr. et al. | 414/563 |
| 4,611,968 | 9/1986 | Casteel | |
| 4,674,943 | 6/1987 | Nespor | 414/563 |
| 4,679,978 | 7/1987 | Holmes et al. | 414/563 |
| 4,775,285 | 10/1988 | Zackovich | 414/563 |

OTHER PUBLICATIONS

2-Sales Brochures Century Wrecker Corp.
1-Sales Brochures No Mar Towing Equipment Co.
1-Sales Brochures Merlin Hy Jacker, Inc.
2-Sales Brochures Holmes International.

Primary Examiner—Frank E. Werner
Assistant Examiner—Robert S. Katz
Attorney, Agent, or Firm—Zarley, McKee, Thomte Voorhees & Sease

[57] ABSTRACT

An underlift attachment for tow trucks is attached to a tow truck by initially cutting a vertical slot in the tailboard of the tow truck's housing. A pocket member is welded in the slot flush with the tailboard, and a pivotable boom arm is mounted to pivot between a storage position journaled within the pocket, and a working position extending generally horizontally rearwardly from the tow truck. The tow truck's tow cable is extended from the tow truck's boom through the pulley hook and connected to the boom arm to raise and lower it between its storage and working positions. The boom arm of the attachment includes an extensible telescoping arm journaled within a boom arm housing, and is provided with a pivotal cross bar. The extensible arm is connected to a hydraulic cylinder which will extend or retract the telescoping arm and the cross bar. Attachment brackets are slidably mounted on the ends of cross bar and serve to hold the axle of a vehicle, or the like, for towing.

2 Claims, 5 Drawing Sheets

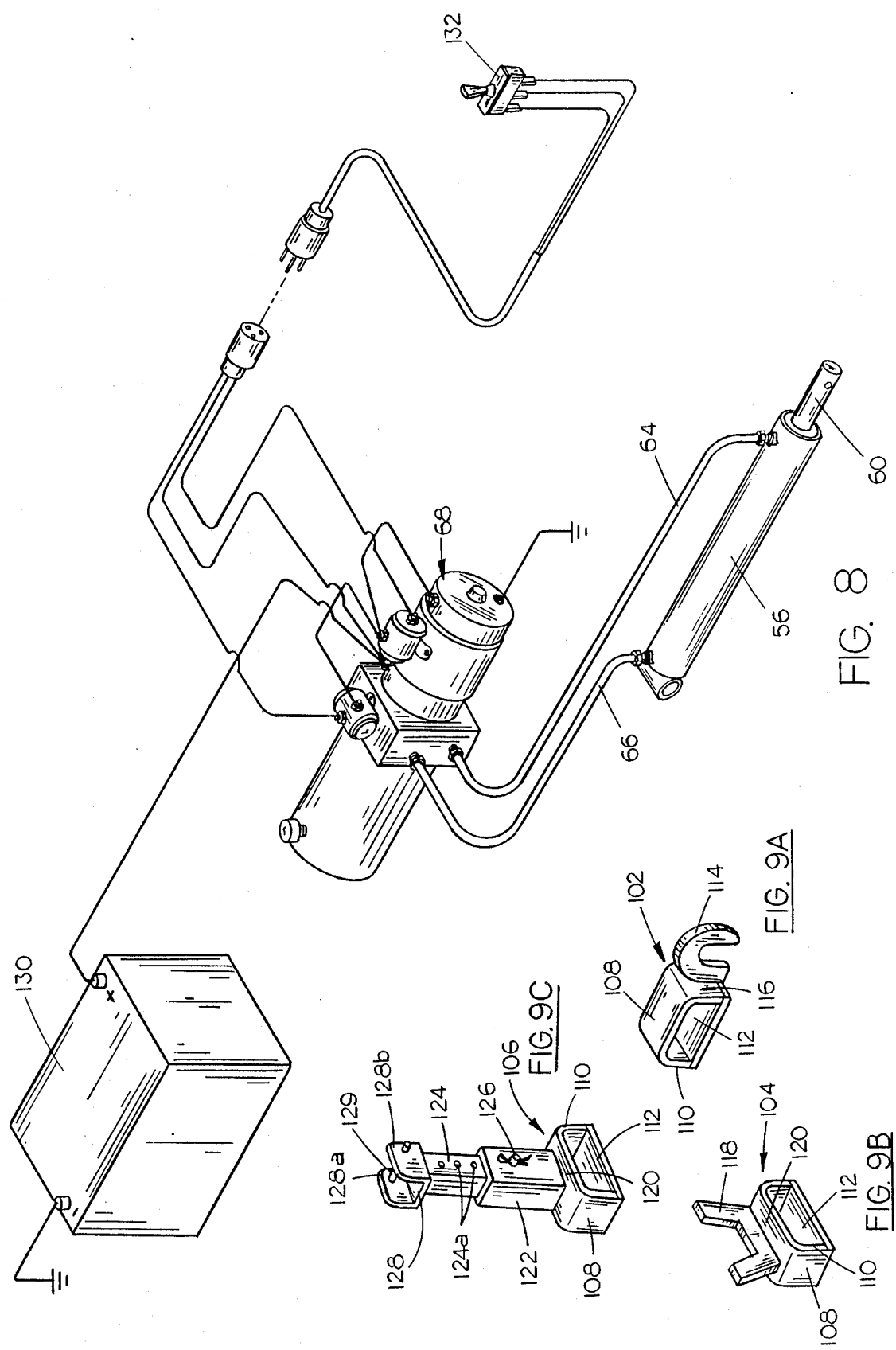

4,875,269

UNDERLIFT ATTACHMENT FOR TOW TRUCKS

TECHNICAL FIELD OF THE INVENTION

This invention relates generally to vehicle lifting and towing apparatus and more particularly to a towing apparatus which is adapted to lift and tow large vehicles.

BACKGROUND OF THE INVENTION

Apparatus for lifting and towing automobiles are well known in the prior art, however, there are few known structures which are adapted for lifting and towing large, bulky and heavy vehicles. Typically, a disabled vehicle would be towed by a tow truck by attaching a hook on the end of a cable which is strung over a projecting boom on the tow truck, the hook being attached to the undercarriage or bumper of the vehicle. The cable would then be winched so as to raise the front end of the vehicle. This method is still utilized in many instances, and towing structures adapted for this purpose are currently maintained on tow trucks.

A recent development in the field of towing apparatuses is in the development of a wheel lift apparatus which utilizes a pair of wheel supporting frames disposed at the end of a boom to raise the forward wheels of a vehicle for towing. Unfortunately, the known prior art underlift apparatuses project rearwardly from the tow truck thereby increasing the chances of interference with the vehicle towed therebehind. Such underlift equipment is also conventionally "built-in" and thus requires the purchase of a new vehicle or a substantial modification to a conventional vehicle in order to add such a structure.

Prior art underlift towing devices also suffer other drawbacks. Typically, prior art underlift apparatuses projected significantly rearwardly and upwardly from the vehicle when stored, thereby interfering with any other desired operations of the tow vehicle. Such apparatuses were also typically extremely bulky requiring large and heavy materials and structure to perform the task of lifting and towing large vehicles. It was also a problem for prior art apparatuses to support a towed vehicle closely proximate the rear of the tow truck for proper weight distribution, and to provide a variety of boom heights to allow clearance in all situations. Finally, prior art underlift apparatuses were not typically capable of use on a wide variety of vehicles.

It is therefore a general object of the present invention to provide an improved underlift attachment for tow trucks.

Another object of the present invention is to provide an underlift attachment which is easily attached to a conventional tow truck.

A further object is to provide an underlift attachment which is flush against the tailboard of the tow truck when stored.

Yet another object of present invention is to provide an underlift attachment which operates using the conventional tow truck's existing controls.

Still a further object is to provide an underlift attachment with easily connectable accessory brackets for use on a wide variety of vehicles.

Another object is to provide an underlift attachment which stores in a position that does not interfere with the tow truck's conventional towing apparatus.

Yet a further object is to provide an improved method for attaching an underlift attachment to a conventional tow truck.

Another object is to provide a method of attaching an underlift to a tow truck which will allow the attachment to lie flush with the tailboard when stored.

These and other objects will be apparent to those skilled in the art.

SUMMARY OF THE INVENTION

The underlift attachment for tow trucks of this invention is attached to a conventional tow truck by initially cutting a vertical slot in the tailboard of the tow truck's housing. A pocket member is welded in the slot flush with the tailboard, and a pivotable boom arm is mounted to pivot between a storage position journaled within the pocket, and a working position extending generally horizontally rearwardly from the tow truck. The pivotable boom arm is raised and lowered using the existing tow cable and tow hooks on the tow truck. A pulley hook is connected to a lifting strap on the boom arm, and the tow cable is extended from the tow truck's boom through the pulley hook and connected to the tailboard of the tow truck to produce mechanical advantage when raising or lowering the pivotable boom arm.

An extensible telescoping arm is journaled within a boom arm housing and is provided with a pivotal cross bar. The extensible arm is connected to a hydraulic cylinder which may be activated to extend or retract the telescoping arm and the cross bar. Attachment brackets are slidably mounted on the ends of cross bar and serve to hold the axle of a vehicle, or the like, for towing.

The boom arm of the underlift attachment is stored in a vertical position flush with the tailboard of the tow truck and out of the way of conventional operations of the tow truck. A clamping assembly is provided to lock the boom arm in its storage position. A locking bracket is also provided to maintain the cross bar in a rigid condition while stored.

BRIEF DESCRIPTION OF THE DRAWINGS

FIG. 8 is a schematic perspective view of the electro-hydraulic system of the invention; and FIG. 9a is a perspective view of an attachment bracket for the cross bar of the invention.

FIG. 9b is a perspective view of a second attachment bracket for the cross bar of the invention.

FIG. 9c is a perspective view of a third attachment bracket for the cross bar of the invention.

DESCRIPTION OF THE PREFERRED EMBODIMENT

Figure 1:
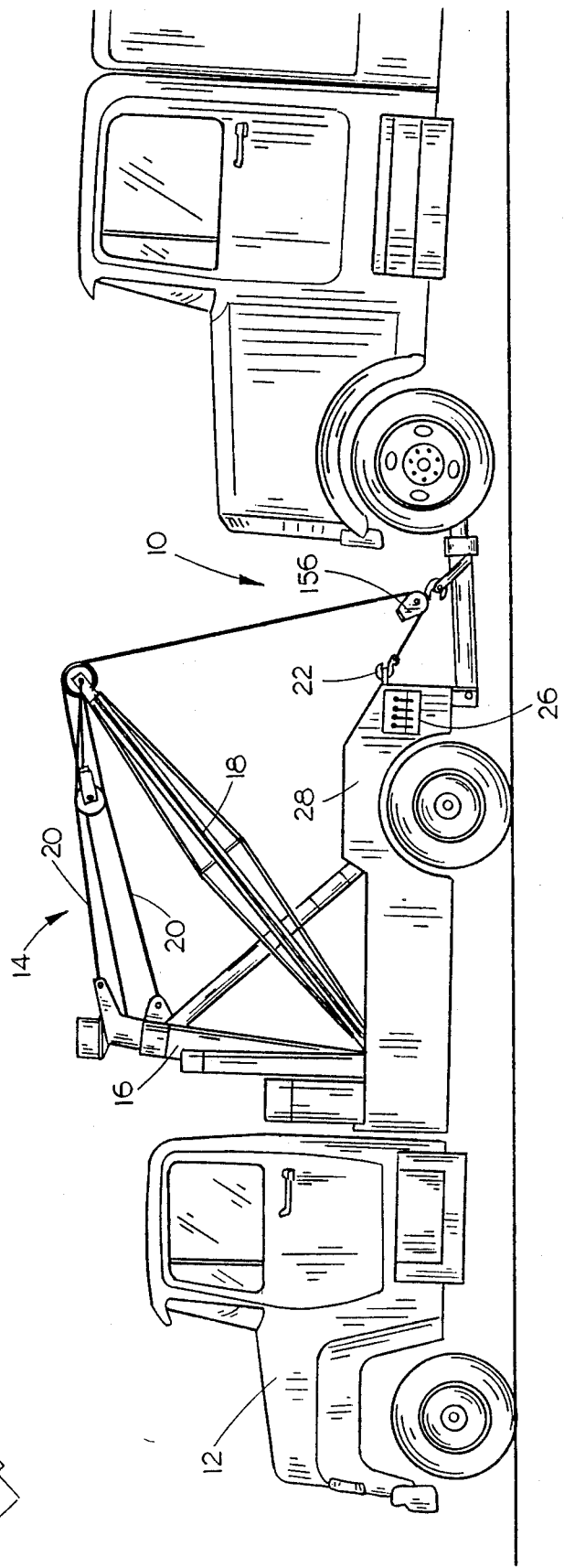
FIG. 1 is a side elevation view of the invention in use on a tow truck.

Referring now to the drawings, in which similar or corresponding parts are identified by the same reference numeral, and more particularly to FIG. 1, the underlift attachment of this invention is designated generally at 10 and is mounted on the rearward end of a conventional tow truck 12. Tow truck 12 includes a conventional boom apparatus 14 including a superstructure 16 to which a boom arm 18 is pivotally connected. A series of support cables 20 are extended or retracted in order to pivot boom arm 18 with relation to tow truck 12. A tow hook 22 is attached to a tow cable 24 which is directed over boom arm 18 and thence to a winch (not shown) on superstructure 16 in a conventional fashion such that hook 22 may be extended or retracted as desired.

A set of power control switches 26 are utilized to operate the boom arm 18 and tow cable 24, and are located at the rearward end of tow truck housing 28. Housing 28 includes a vertically oriented tailboard 30 which is generally projection free so as to allow close towing of a vehicle. A pair of outriggers (not shown) may be operably mounted to the underside of housing 28 in a conventional manner to support tow truck 12 during heavy lifting operations.

Figure 7:
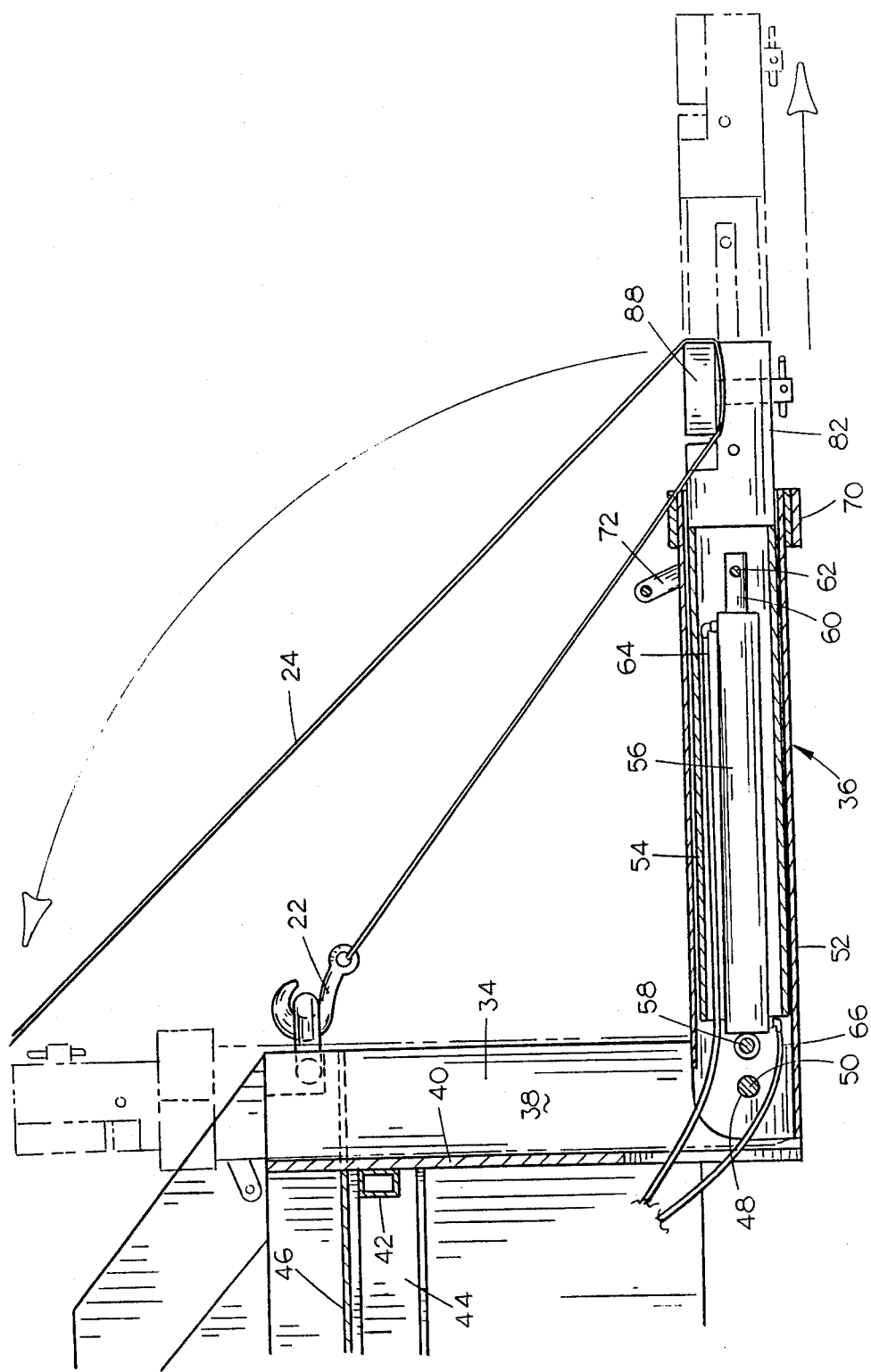
FIG. 7 is a side sectional view of the invention mounted on a tow truck.

The underlift attachment 10 of this invention includes a pocket 34 which is mounted in tailboard 30 of the tow truck, and a pivotable and extendable boom 36. Pocket 34 is formed from a channel member oriented vertically with the open portion facing rearwardly, pocket 34 being installed in a slot cut in the tailboard 30 to a depth such that the side walls 38 of pocket 34 are flush with tailboard 30. Pocket 34 is welded to housing 28 for support. An additional cross-beam 42 (see FIG. 7) is welded to the back wall 40 of pocket 34 and to the existing truck frame 44 for additional support. The upper end of pocket 34 projects slightly above the floor 46 of truck housing 28 such that is flush with the top of tailboard 30. The lower end of pocket 34 projects downwardly below the lower edge of tailboard 30 and has a pair of gussets 32 affixing it thereto. A pair of coaxial apertures 48 in side walls 38 have a pivot pin 50 journaled therethrough and affixed in position. Underlift boom 36 is pivotally connected to pivot pin 50 to pivot between a vertical storage position, encased in pocket 34 (see FIG. 5 and the broken line drawing in FIG. 7), and an operable towing position projecting rearwardly from tow truck 12 (see FIG. 1).

Boom 36 is composed of a hollow tubular housing 52 pivotally mounted at one end to pin 50, and a tubular arm 54 telescoping from within housing 52 as shown in the drawings. A hydraulic cylinder 56 is attached, via pin 58, to housing 52 adjacent its pivotally-connected end. The extensible arm 60 of cylinder 56 is connected, via pin 62, to telescoping arm 54. A pair of hydraulic lines 64 and 66 are connected to hydraulic cylinder 56 and extend to an electrohydraulic pump 68 (shown in FIG. 8). Thus, telescoping arm 54 may be extended or retracted by operation of hydraulic cylinder 56 (as shown in broken lines in FIG. 7).

Tubular housing 52 is generally rectangular in crosssection and has dimensions so as to fit within pocket 34 and flush with tailboard 30. A collar 70 is welded to the projecting end of housing 52 to strengthen that portion where additional stress will be applied during towing. Housing 52 is journaled through a U-shaped lift strap 72 having upwardly projecting ends 74 with coaxial apertures 76 therein. A pin 78 is journaled through apertures 76 in lift strap 72, and is utilized to lift the free end of housing 52 to pivot housing 52 about pivot pin 50.

Figure 2:
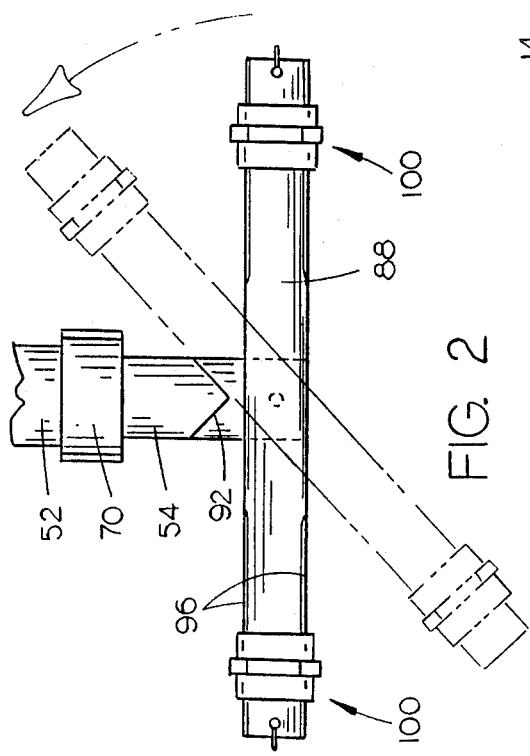
FIG. 2 is a top view of the cross bar portion of the invention.
Figure 6:
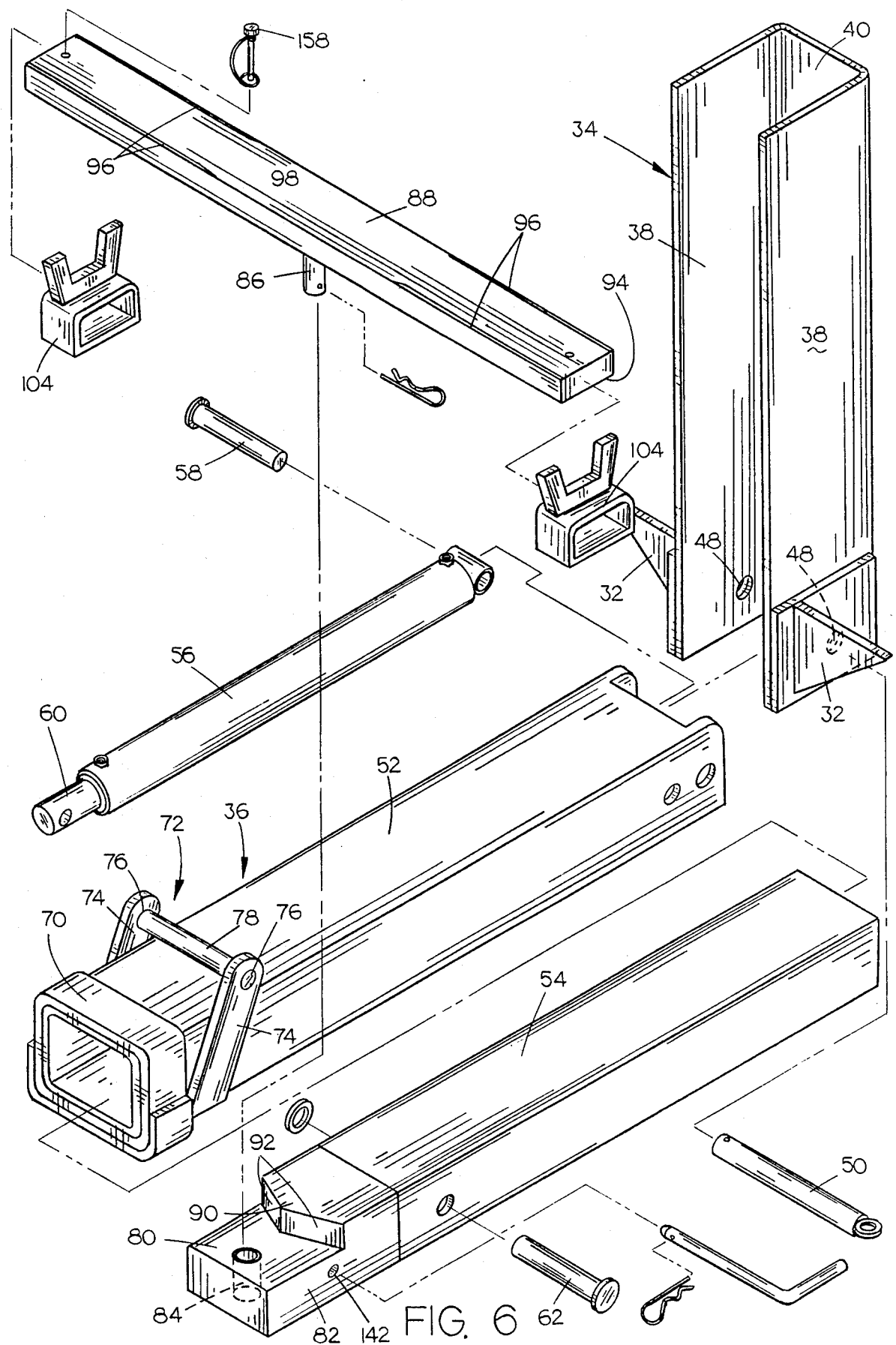
FIG. 6 is an enlarged exploded perspective view of the underlift attachment of this invention.

Telescoping arm 54 has a stepped ledge 80 formed in its projecting end 82 as shown in FIG. 6. Stepped ledge 80 has a vertically-oriented tube 84 projecting downwardly therethrough which will receive the vertical shaft 86 of a pivotable cross bar 88, as will be discussed in more detail hereinbelow. The step 90 down to ledge 80 has a pair of beveled walls 92 which will serve as a stop against undue pivotal movement of cross bar 88 (see FIG. 2).

Cross bar 88 is a two inch by four inch solid bar with shaft 86 centered and depending from its bottom surface 94. The longitudinal edges 96 of the upper surface 98 of cross bar 88 are milled to a radius to fit within the crosssection of a one-half inch by five inch tube, for a purpose described below.

Referring now to FIG. 9, a wide variety of mounting brackets, designated generally at 100, are shown. Three specific types of mounting brackets are shown and described herein -- namely, a hook bracket 102, axle bracket 104, and a spring-lift bracket 106. Each bracket 100 has an identical base portion 108 which is formed from a one half-inch by five inch tube section cut longitudinally in half to form the upper half 110 of base portion 108. The bottom 112 of base portion 108 is a five inch plate welded to top portion 110. The hollow tubular form created by this combination is cut into approximate four inch sections to form the base portion 108 upon which the desired bracket is affixed. It can be seen that base portion 108 has a hollow portion which will slide onto either end of cross bar 88, the milled longitudinal edges 96 matching the radius of the upper portion 110 of base portion 108.

Hook bracket 102 has a hook 114 affixed to a side wall 116 of base portion 108. Hook brackets 102 may be used for towing by wrapping chain or cable around the hook portions, and then attaching the cable or chain to the vehicle to be towed.

Figure 3:
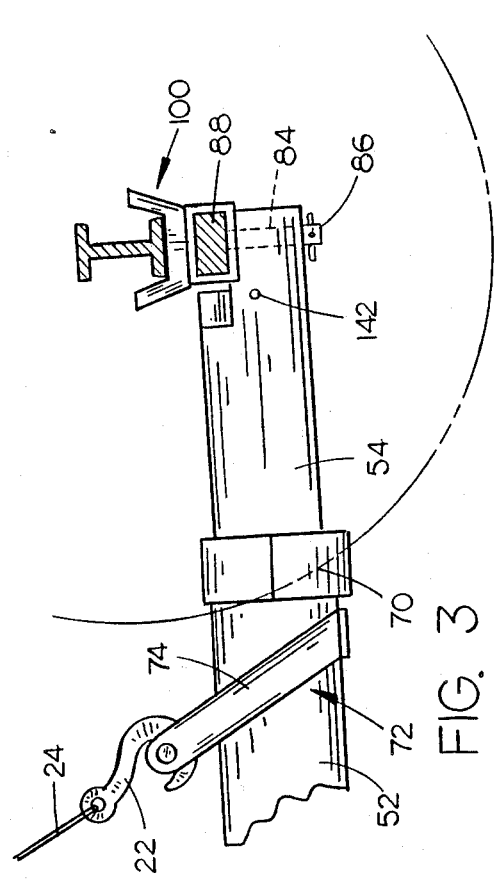
FIG. 3 is a side elevation view of the cross bar portion of the invention.

Axle brackets 104 have a generally U-shaped plate 118 affixed to the top surface 120 of base portion 108. Placing one axle bracket 104 on each end of cross bar 88 will allow the axle of a vehicle to rest within the U-shaped plate member 118 (see FIG. 3).

The spring-lift brackets 106 include an upstanding tubular member 122 affixed to the top surface 120 of base portion 108. A telescoping pole 124 is journaled within upstanding tube 122 and has a series of apertures 124a spaced vertically therealong through which a pin 126 may be journaled so as to adjust the length to which telescoping pole 124 is adjusted. A U-shaped bracket 128 is mounted on top of pole 124 and has a pin 129 journaled through apertures in legs 128a and 128b as shown in the drawings. A spring-lift bracket 106 is connected to each end of cross bar 88 and positioned under the leaf-spring at each side of the vehicle to be towed. The brackets are positioned near one end of each leaf-spring, where there are only one or two leaves, and pin 129 is then inserted through the apertures in legs 128a and 128b to lock the spring to bracket 106. It has been found that attachment of the underlift 10 to the suspension system of the vehicle to be towed (via spring-lift brackets 106) greatly improves the towing characteristics of the vehicle. The small bumps and lurches common with other towing methods are virtually eliminated. This decreases the chance of damaging the towed vehicle, as well as decreasing the difficulty of towing the vehicle.

Referring now to FIG. 8, hydraulic cylinder 56 is hydraulically connected to 12-volt D.C. electrohydraulic pump 68 via hydraulic lines 64 and 66. Pump 68 is electrically connected to the truck's battery 130 and to a double pole, double-throw self-centering switch 132. Activation of switch 132 in one direction will cause extensible arm 60 of hydraulic cylinder 56 to extend, and activation of switch 132 in the opposite direction will cause extendable arm 60 to retract within hydraulic cylinder 56. The center position of the switch is an "off" position. Switch 132 may be mounted adjacent the power controlled switches 26 on the truck's housing, or within the cab of the truck, as desired.

Figure 4:
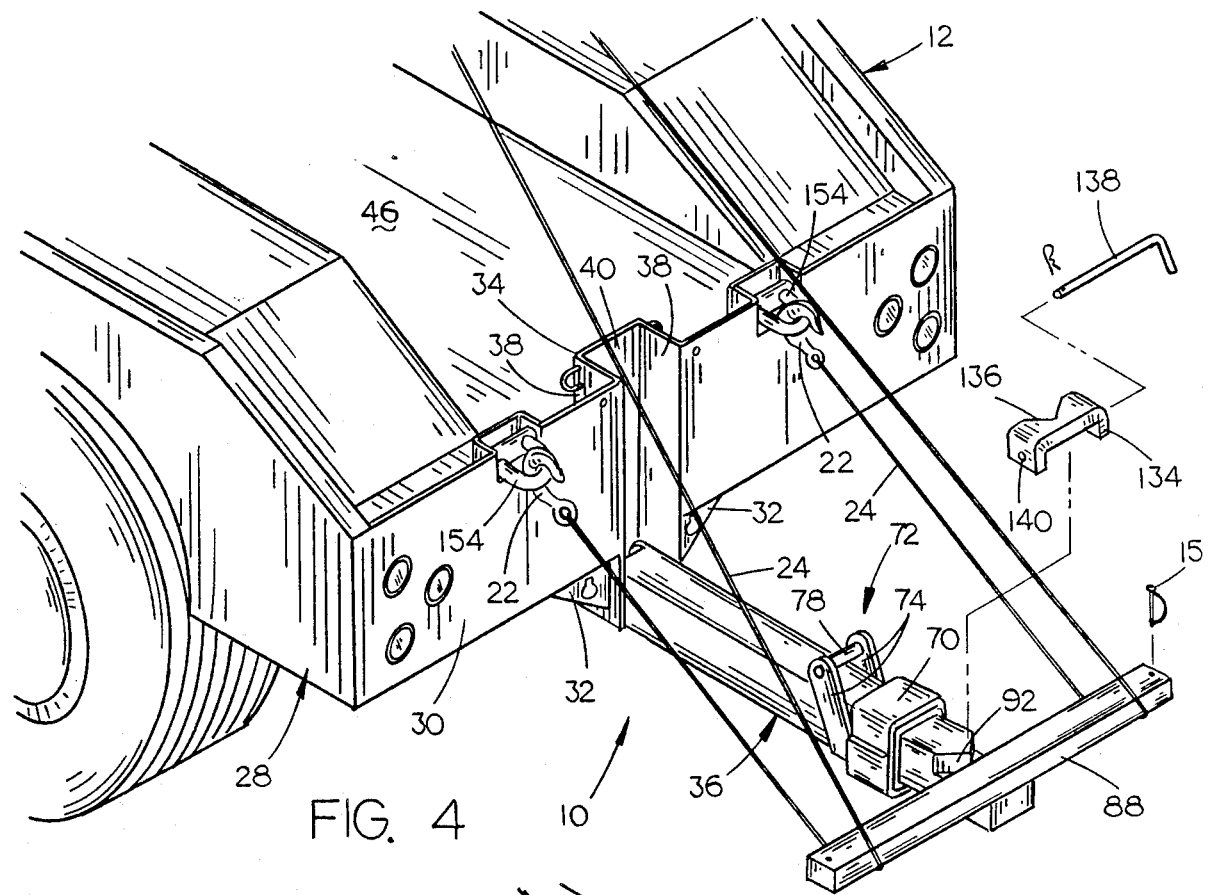
FIG. 4 is a perspective view of the invention being prepared to be raised to a storage position.
Figure 5:
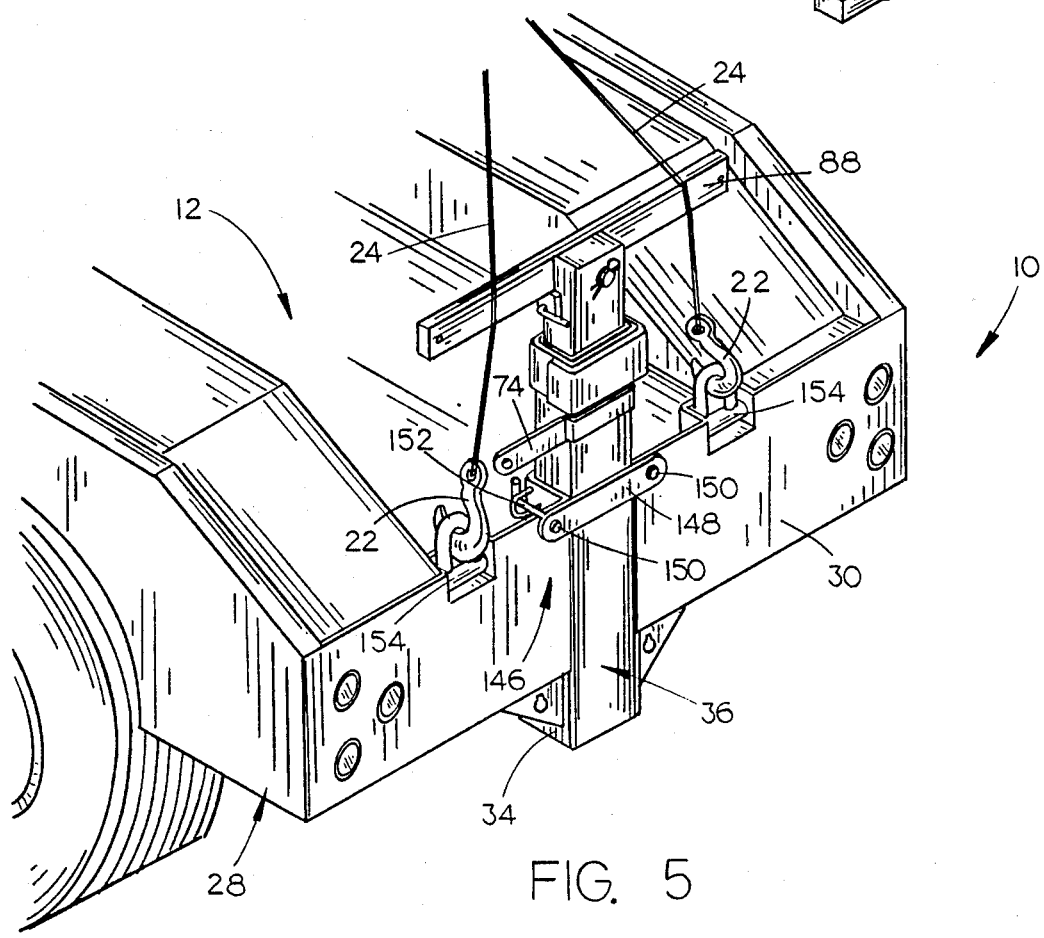
FIG. 5 is a perspective view of the invention in a storage position.

Referring now to FIGS. 4 and 5, the underlift attachment 10 is shown being lowered from a storage position (FIG. 5) to an operable position (FIGS. 4 and 1). An U-shaped locking bracket 134 is shown in FIG. 4 which fits between cross bar 88 and beveled walls 92 on boom arm 36 so as to lock cross bar 88 in a rigid position perpendicular to boom arm 36. Lock bracket 134 has a V-shaped notch 136 in one edge which matches bevel walls 92 on boom arm 36, as shown in the drawings. A pin 138 is journaled through a pair of apertures 140 in lock bracket 134 and through apertures 142 (see FIG. 6) in arm 36, to secure lock bracket 134 onto boom arm 36.

Boom arm 36 is held in a vertically-oriented storage position within pocket 34 and flush to tailboard 30, as shown in FIG. 5, by a clamp assembly designated generally at 146. Clamp assembly 146 includes a strap 148 which is affixed across boom arm 136 by a pair of bolts 150 journaled through the ends of strap 148 and apertures in tailboard 30. The ends of bolts 150 are releasably connected to projecting rings 152 mounted on the side walls 38 of pocket 34, as shown in the drawings.

Tow cables 24 are looped around each end of cross bar 88 in order to raise or lower the boom arm 36 from the storage position. Tow hooks 22 are connected to pivotable rings 154, conventional on the tailboard of tow truck 12, to lower boom arm 36 to an operable position. In operation, clamp assembly 146 is released and set aside, and tow cables 24 are extended such that boom arm 36 will be allowed to pivot downwardly to the ground (shown in FIG. 4). Tow cables 24 are then removed from around cross bar 88 and pulley hooks 156 (shown in FIG. 1) are hooked to pin 78 of lift strap 72 with tow cable 24 wrapped around the pulley thereof. Thus, extending or retracting tow cables 24 will pivot boom arm 36 upwardly to the desired position utilizing power control switches 26 existing on the tow truck 12. Lock bracket 136 may then be released so that cross bar 88 may be pivoted on its depending shaft 86.

Once in position, the appropriate attachment bracket 100 is slipped onto each end of cross bar 88 and locked in place with locking clip 158 (see FIG. 4). Cross bar 88 and telescoping arm 54 may then be extended outwardly from tow truck 12 by activating switch 132 and hydraulic cylinder 56, as described hereinabove.

It can therefore be seen that the above invention fulfills at least all of the above stated objectives.

I claim:

1. A method for attaching a vehicle-towing underlift to a tow truck, comprising the steps of: providing a vehicle towing underlift attachment, including:
   a generally vertically-oriented channel member having a pair of side walls and a rearward wall, and having upper and lower ends;
   a boom arm pivotally mounted at one end to the lower end of said channel member, and mounted to pivot between a storage position, wherein said boom arm is received between the side walls of the channel member and abutting the rearward wall of the channel member such that said boom arm is received within said channel member flush with the edges of the side walls, and a pivotable operable position projecting outwardly from said channel member;
   said boom arm including a tubular housing member, an operable extendable arm telescoping therefrom, and means connected between said tubular housing member and said extendable arm for extending and retracting said extendable arm with respect to said tubular housing member;
   said extendable arm of said boom arm further including a cross bar member pivotally and removably mounted on said extendable arm, for movement about an axis generally perpendicular to longitudinal axis of said extendable arm;
   and bracket means selectively, removably connected to each end of said cross bar for selective connection to a vehicle to be towed;
   providing a tow truck, having: a boom connected to the tow truck housing; an operable winch mounted on said housing; a hook member attached to a tow cable journaled over said boom and connected to said winch; and a generally flat, vertical tailboard;
   cutting a vertical slot in the tailboard and housing of said tow truck to a depth equal to the depth of said pocket of said underlift attachment;
   affixing said pocket portion in said slot with the side walls flush with the tailboard and the upper end flush with the upper edge of the tailboard;
   mounting said electrohydraulic pump to said tow housing; and
   electrically connecting said electrohydraulic pump and said switch means to the battery of the tow truck.

2. The method of claim 1 further comprising the step of selectively connecting said tow truck hook to said attachment boom arm to operably hold said boom arm in an operable position pivoted outwardly from said tow truck.

* * * * *